(12) United States Patent
Ito et al.

(10) Patent No.: US 8,446,047 B2
(45) Date of Patent: May 21, 2013

(54) VEHICLE INTERIOR LIGHT

(75) Inventors: Atsuhiko Ito, Miyoshi (JP); Shinichi Yaoichi, Okazaki (JP); Nobuki Hayashi, Toyota (JP); Takuma Saito, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 342 days.

(21) Appl. No.: 12/877,137

(22) Filed: Sep. 8, 2010

(65) Prior Publication Data
US 2011/0121730 A1 May 26, 2011

(30) Foreign Application Priority Data
Nov. 24, 2009 (JP) ................................. 2009-266753

(51) Int. Cl.
*H03K 3/00* (2006.01)

(52) U.S. Cl.
USPC .......................................................... 307/108

(58) Field of Classification Search
USPC .. 307/10.1, 10.8, 112, 113, 149, 157; 315/77, 315/84, 178, 224; 362/471, 488, 490, 492, 362/494, 544, 545, 611, 612; 40/593
See application file for complete search history.

(56) References Cited

U.S. PATENT DOCUMENTS

| | | | |
|---|---|---|---|
| 6,013,956 A * | 1/2000 | Anderson, Jr. ............... | 307/10.1 |
| 6,329,755 B1 | 12/2001 | Nakade et al. | |
| 6,945,678 B2 * | 9/2005 | Sugihara et al. .............. | 362/490 |
| 7,213,952 B2 * | 5/2007 | Iwai ............................... | 362/488 |
| 7,852,007 B2 * | 12/2010 | Kuwana .......................... | 315/77 |

FOREIGN PATENT DOCUMENTS

| | | |
|---|---|---|
| JP | 2004-182012 | 7/2004 |
| JP | 2004-322860 | 11/2004 |

OTHER PUBLICATIONS

China Office action, dated Oct. 10, 2012 along with an english translation thereof.

* cited by examiner

*Primary Examiner* — Jared Fureman
*Assistant Examiner* — Duc M Pham
(74) *Attorney, Agent, or Firm* — Greenblum & Bernstein, P.L.C.

(57) ABSTRACT

A vehicle interior light includes a lighting source that illuminates a vehicle interior; an decorative lighting source that decoratively illuminates the vehicle interior; a lighting switch that controls on-off state of the lighting source; an decorative lighting switch that controls on-off state of the decorative lighting source and the lighting source; and a light dimming unit that lowers illuminance of the lighting source. When the decorative lighting source is turned on, power is supplied to the decorative lighting source so that the decorative lighting source is lit up, while power is supplied to the lighting source through the light dimming unit so that the lighting source is lit up with low illuminance.

5 Claims, 2 Drawing Sheets

VEHICLE INTERIOR LIGHT

CROSS-REFERENCE TO RELATED APPLICATIONS

The present application claims priority under 35 U.S.C. §119 of Japanese Application No. 2009-266753 filed on Nov. 24, 2009, the disclosure of which is expressly incorporated by reference herein in its entirety.

BACKGROUND OF THE INVENTION

1. Field of the Invention

The present invention relates to a vehicle interior light mounted in a ceiling or the like in the interior of a vehicle such as an automobile. More particularly, the invention relates to a vehicle interior light including both functions as a lighting for interior illumination and a lighting for decorative interior illumination, wherein, when it functions as the decorative lighting, the light source for the lighting can be controlled with one switch in sync with the light source for the decorative lighting, and the light is lit up with low illuminance (low illumination intensity).

2. Description of the Related Art

Vehicle interior lights having both functions of illuminating the vehicle interior with high illuminance and of illuminating with low illuminance have been conventionally known. A vehicle interior light of this type, for example, having a plurality of lighting LEDs and one night-light LED, is known (refer to Related Art 1, for example). This vehicle interior light provides high-illuminance illumination light by turning on the plurality of room lamp LEDs, as well as low-illuminance dim light by turning on the single night-light LED alone.

Another known vehicle interior light has only one bulb, for example, wherein turning on the lighting switch provides high-intensity illuminating (high illuminance), while turning on a door/light sync switch initiates power supply to the bulb via a resistor element upon the door being opened so as to provide low-intensity illuminating (low illuminance) (refer to Related Art 2, for example). In this vehicle interior light, the illuminance is changed by switching the electrical current applied to the single bulb.

In recent years, vehicle interior lights having a decorative lighting function that provides decorative illuminating with low illuminance, using LEDs or the like as the lighting source, in addition to the high-illuminance room lamp function, have been developed. This decorative lighting function is for improving the lighting design, for example, by emitting light of a different color than that of the room lamp.

[Related Art 1] Japanese Patent Laid-open Publication No. 2004-322860

[Related Art 2] Japanese Patent Laid-open Publication No. 2004-182012

However, with the above-mentioned vehicle interior light having the decorative lighting function, the lighting and decorative lighting are separately controlled, and so the system as a whole cannot be said to have an integral decorative lighting function.

It is conceivable that the above-mentioned vehicle interior light having a plurality of room lamp LEDs and one night-light LED could simply be combined with the vehicle interior light having the decorative lighting function. Even in this case, however, as the circuits for high-intensity illuminating, low-intensity illuminating, and decorative illuminating would be separately provided and not in sync with each other, switches would need to be separately operated, which is troublesome and poorly operable.

It is also conceivable that the above-mentioned vehicle interior light having only one bulb wherein high-illuminance and low-illuminance are switched over using the lighting switch and door/light sync switch could simply be combined with the vehicle interior light having the decorative lighting function. However, in this case, too, the lighting function and decorative lighting function would be configured by separate circuits, so that two or more switches need to be operated for the decorative lighting, resulting in poor operability. Moreover, the low-intensity illuminating is provided only when the door/light sync switch has been turned on and the door is opened, so the usability is poor, because the low-intensity illuminating is not provided at any given time such as during driving at night.

SUMMARY OF THE INVENTION

The embodiments of the present invention was made in view of the above circumstances, its object being to provide a vehicle interior light including both functions as a lighting for interior illumination and a decorative lighting for decorative interior lighting, wherein, when it functions as the decorative lighting, the light source for the lighting can be controlled with one switch in sync with the light source for the decorative lighting, and wherein high-intensity illuminating, low-intensity illuminating, and decorative illuminating can be switched optionally and with good operability.

One aspect of the present embodiments provides a vehicle interior light, including a lighting source that illuminates a vehicle interior; an decorative lighting source that decoratively illuminates the vehicle interior; a lighting switch that controls on-off state of the lighting source; an decorative lighting switch that controls on-off state of the decorative lighting source and the lighting source; and a light dimming unit that lowers illuminance of the lighting source, wherein when the decorative lighting source is turned on, power is supplied to the decorative lighting source so that the decorative lighting source is lit up, while power is supplied to the lighting source through the light dimming unit so that the lighting source is lit up with low illuminance.

In a further aspect, the light dimming unit is provided such as to connect across a wiring between the lighting source and the lighting switch and a wiring between the decorative lighting source and the decorative lighting switch.

In a further aspect, the light dimming unit includes a resistor element, and a reverse current preventing element that prevents the decorative lighting source from being lit up by the lighting switch.

In a further aspect, the lighting source is a bulb, while the decorative lighting source is an LED.

According to the vehicle interior light of the present embodiments, the lighting source and the decorative lighting source can be turned on in sync with each other by operating the decorative lighting switch. Moreover, the lighting source emits light with low illuminance when used for the decorative lighting purpose.

Therefore, as compared to operating the switches of the lighting source and decorative lighting source separately as conventionally done, the operability can be enhanced, as it is all achieved by operating only one decorative lighting switch. A passenger can operate the decorative lighting switch at any given time to turn on the lighting source with low illuminance, so that, in contrast to conventional low-intensity illuminating that is enabled only when the door is open, this feature can be effectively taken advantage of when decorative illuminating with a brightness that will not impose a disturbance to driving is desired in the vehicle interior, for example, during driving at night.

Further, since the decorative lighting source can be turned on at the same time while the lighting source emits light with low illuminance, the combination of the light sources with different colors and lighting ranges can further enhance the lighting design, as compared to using a decorative lighting source alone. Moreover, the low-intensity illuminating of the lighting source is achieved electrically by the light dimming unit so that heat generation of the lighting source is kept low and the lighting does not lead to a large decrease of service life of the lighting source, and also there is no need to particularly increase heat resistance of the casing or the like of the lighting source to withstand the heat generated by the lighting.

Furthermore, since the lighting source and decorative lighting source are accommodated inside a single vehicle interior light, they can share part of their respective circuits, whereby the number of components and the number of wiring steps are reduced as compared to the case where the decorative lighting source is mounted in a separate location.

If the light dimming unit is connected across the wiring between the lighting source and lighting switch and the wiring between the decorative lighting source and decorative lighting switch, sync control of each light source using the decorative lighting switch can be realized with a simple circuit.

Further, if the light dimming unit includes a resistor element and a reverse current preventing element, the lighting source can be designed to have any given illuminance, and also, a situation will not arise where the decorative lighting source is turned on when the lighting switch is operated.

If the lighting source is a bulb, it can secure sufficient illuminance for the lighting. Further, if the decorative lighting source is an LED, power consumption can be kept low, and various colors can be selected for the decorative lighting.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

Figure 1:
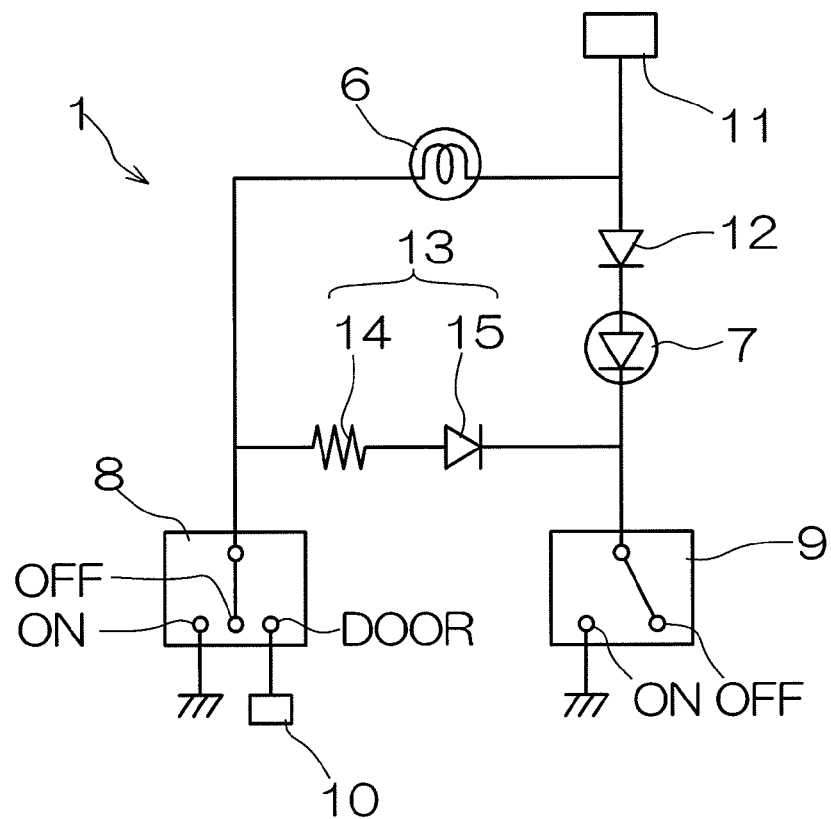
FIG. 1 is a circuit diagram showing a vehicle interior light of the present embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The vehicle interior light according to the present invention includes a lighting source for illuminating an interior of a vehicle such as an automobile, a decorative lighting source for providing decorative illuminating of the vehicle interior, a lighting switch for controlling the lighting source, and a decorative lighting switch for controlling the decorative lighting source.

The above "lighting source" can be of any type, and can have any shape, size, material, or structure, and can be provided in any number, as long as it is a light source capable of illuminating the vehicle interior with an illuminance sufficiently high to make articles in the vehicle interior visible. Examples of such a lighting source include bulbs, fluorescent lamps, LEDs, and the like. The lighting source may either illuminate the entire vehicle interior as a room lamp, or can light up a limited spot in the vehicle interior such as a map light.

The above "decorative lighting source" can be of any type, and can have any shape, size, material, or structure, and can be provided in any number, as long as it is a light source capable of emitting light such as to decorate the vehicle interior. Examples of such a decorative lighting source include LEDs of various colors such as blue, orange, white, green, or the like, neon tubes, fluorescent lamps, bulbs, and the like.

The above "lighting switch" can have any shape, size, material, or structure, and can be provided in any number, as long as it is capable of controlling on and off of the lighting source. Examples of the lighting switch include a two contact switch that simply switches between on and off of the lighting source, or a door/light sync switch that can be switched to a door/light sync state, in which the light is turned on when the door is opened, in addition to the on/off switching.

The above "decorative lighting switch" can have any shape, size, material, or structure, and can be provided in any number, as long as it is capable of controlling on and off of the lighting source and the decorative lighting source. Examples of the decorative lighting switch include a two contact switch that simply switches between on and off of the lighting source and the decorative lighting source in sync with each other (see, for example, switch 9 in FIG. 1), or a ganged-control switch that can be switched to a synchronous on-off state, in which the lighting source and decorative lighting source are on-off controlled in sync with each other, in addition to the on/off switching of the decorative lighting source (see, for example, switch 9' in FIG. 4).

With a combination of such a lighting switch and a decorative lighting switch, on-off state of the lighting source and decorative lighting source can be controlled in various ways. For example, when the lighting switch is off, the low-intensity illuminating of the lighting source and the illuminating of the decorative lighting source can be achieved in sync with each other using the decorative lighting switch. Alternatively, when the lighting switch is on, the lighting source is lit up with normal illuminance, while the lighting of the decorative lighting source can be controlled using the decorative lighting switch.

A light dimming unit is wired between the lighting source and the decorative lighting switch. The above "light dimming unit" can be selected from any given unit as long as it can make the illuminance, or brightness, of the lighting source when lit up by power supplied from the decorative lighting switch lower than the illuminance of the lighting source when lit up by power supplied from the lighting switch. For example, a resistor element for current limiting purpose, a current/voltage limiting circuit using a semiconductor or the like, a power supply control circuit using pulse amplitude modulation or the like, can be used. The light dimming unit can lower the light to a given selected degree, in which the light is used as typical decorative lighting, but to a degree that it does not impose a disturbance during the driving of the vehicle (for example, to a degree that articles in the vehicle interior are not clearly visible). Optionally, the light dimming unit can include a reverse current preventing element.

The above "reverse current preventing element" is an element that activates power supply from the decorative lighting switch to the lighting source while deactivating power supply from the lighting switch to the decorative lighting source, one example thereof being diodes or other like elements.

In one exemplary circuit for this vehicle interior light, for example, one terminal of a power source, lighting source, lighting switch, and the other terminal of the power source may be connected in this order, while one terminal of the power source, decorative lighting source, decorative lighting switch, and the other terminal of the power source may be connected in this order, with the light dimming unit connecting across the wiring between the lighting source and lighting switch and the wiring between the decorative lighting source and decorative lighting switch. With one or both of the lighting switch and decorative lighting switch connected to an ECU or the like circuit, flashing control can be achieved. For example, an ECU may be connected to an end of the decorative lighting switch to sequentially change the brightness of the lighting source and decorative lighting source, or the ECU may be connected to an end of the lighting switch to prevent the lighting source from being lit up brightly even when the lighting switch is turned on during driving.

EXAMPLES

The present invention will be described in more specific terms by way of examples with reference to the drawings.

1. Vehicle Interior Light Configuration

Figure 3:
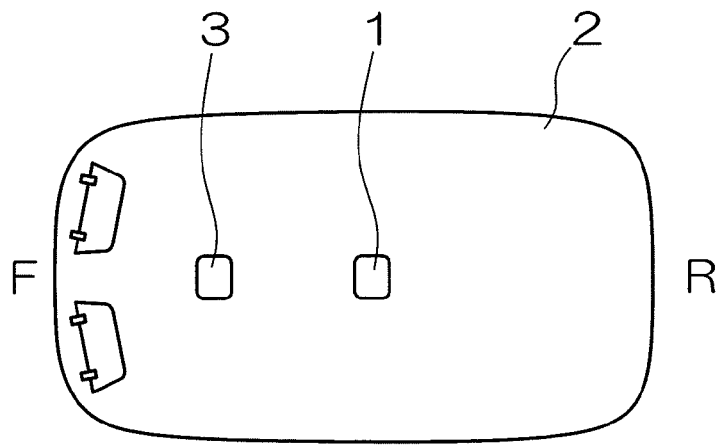
FIG. 3 is a plan view showing a state in which the vehicle interior light is installed in the ceiling of a vehicle.

The vehicle interior light 1 according to the present embodiment is a room lamp mounted in a central portion of the ceiling 2 of an automobile, as shown in FIG. 3. In the drawing, reference numeral 3 appearing on the front side F of the ceiling 2 denotes a map lamp 3 for the front seats.

Figure 2:
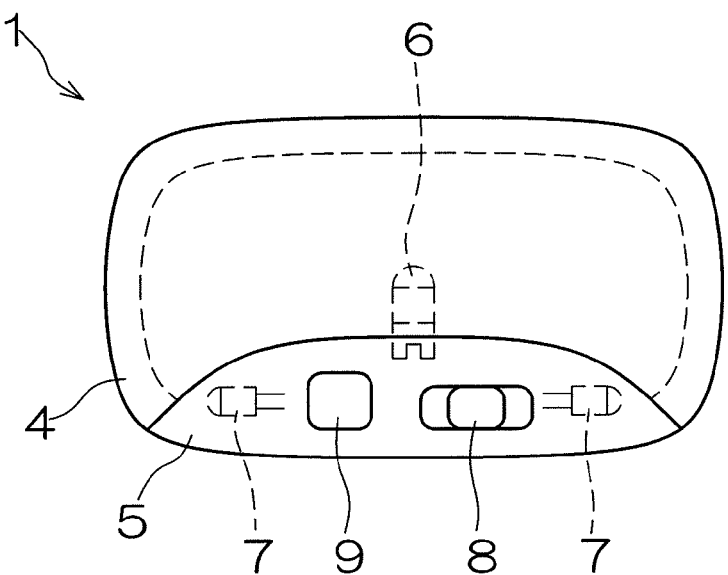
FIG. 2 is a plan view showing the vehicle interior light of the present embodiment.

This vehicle interior light 1 includes, as shown in FIG. 2, a translucent dome-like casing 4, an opaque operation panel 5 mounted in one part of the casing 4, a lighting source 6 and a decorative lighting source 7 accommodated in the casing 4, and a lighting switch 8 and an decorative lighting switch 9 provided in the operation panel 5. The lighting source 6 is a lighting bulb for bright illumination of the vehicle interior, and a single such bulb is provided in a translucent portion substantially in the center of the casing 4. When lit up, the lighting source 6 can make the entire casing 4 glow reddish white. The decorative lighting source 7 is a blue LED, and two such LEDs are provided on the backside of the operation panel 5 such as to be spaced apart from each other. When lit up, the decorative lighting source 7 can make the periphery of the casing 4 glow blue by way of a light guiding unit (not shown).

The lighting switch 8 is for controlling the lighting source 6, and it is a door/light sync switch capable of switching between three, on, off, and door/light sync, modes. The switch is grounded when it is on, while it is open when it is off, and it is connected to an ECU 10 mounted in the vehicle when it is in the door/light sync mode. The decorative lighting switch 9 is for controlling the decorative lighting source 7, and can be switched between two, on and off, modes. The switch is grounded when it is on, while it is open when it is off.

As shown in FIG. 1, the power source 11, the lighting source 6, and the lighting switch 8 are connected in series. The power source 11, a protective diode 12, the decorative lighting source 7, and the decorative lighting switch 9 are connected in series. A light dimming unit 13 is coupled across the wiring between the lighting source 6 and the lighting switch 8 and the wiring between the decorative lighting source 7 and the decorative lighting switch 9. The light dimming unit 13 is formed to have a resistor element 14 and a diode 15 as a reverse current preventing element that allows electric current from the lighting source 6 to pass to the decorative lighting switch 9, these being connected in series.

2. Operation of the Vehicle Interior Light

Next, the operation of the vehicle interior light 1 having the above configuration will be described.

The light emitting states of each of the light sources 6 and 7 for each selected mode of the switches 8 and 9 are shown in Table 1.

TABLE 1

|  | LIGHTING SWITCH | | | | | | | |
|---|---|---|---|---|---|---|---|---|
|  | ON | | DOOR SYNC MODE (DOOR OPEN) | | DOOR SYNC MODE (DOOR CLOSE) | | OFF | |
| DECORATIVE LIGHTING SWITCH | ON | OFF | ON | OFF | ON | OFF | ON | OFF |
| LIGHTING SOURCE | ○ | ○ | ○ | ○ | Δ | X | Δ | X |
| DECORATIVE LIGHTING SOURCE | ○ | X | ○ | X | ○ | X | ○ | X |

○: EMITT (HIGH ILLUMINANCE),
Δ: EMITT (LOW ILLUMINANCE),
X: NOT EMITT (1) When the Lighting Switch 8 is On As shown in Table 1, when the lighting switch 8 is on and the decorative lighting switch 9 is on, electrical current from the power source 11 flows through the lighting source 6 and into ground from the lighting switch 8. The lighting source 6 thus emits light with the same illuminance (hereinafter referred to as "high illuminance") as a normal room lamp. Further, electrical current from the power source 11 flows through the decorative lighting source 7 and into ground from the decorative lighting switch 9. The decorative lighting source 7 is thus turned on.

This results in a lighting design wherein the entire casing 4 glows white with normal brightness while the periphery of the casing 4 glows blue.

When the lighting switch 8 is on and the decorative lighting switch 9 is off, electrical current from the power source 11 flows through the lighting source 6 and into ground from the lighting switch 8. The lighting source 6 thus emits light with high illuminance. On the other hand, with the decorative lighting switch 9 being off, and by means of the diode 15 of the light dimming unit 13, electrical current from the power source 11 does not flow through the decorative lighting source 7, and therefore the decorative lighting source 7 is not turned on. Accordingly, the vehicle interior light 1 functions as a normal room lamp.

(2) When the Lighting Switch 8 is in Sync with the Door

When the lighting switch 8 is in sync with the door, and when the decorative lighting switch 9 is on and the door is open, electrical current from the power source 11 flows through the lighting source 6 and into ECU 10 from the lighting switch 8. The lighting source 6 thus emits light with high illuminance. Further, electrical current from the power source 11 flows through the decorative lighting source 7 and into ground from the decorative lighting switch 9. The decorative lighting source 7 is thus turned on.

When the lighting switch 8 is in sync with the door, and when the decorative lighting switch 9 is off and the door is open, electrical current from the power source 11 flows through the lighting source 6 and supplied to the ECU 10 from the lighting switch 8. The lighting source 6 is thus controlled by the ECU 10, and since the ECU controls the lighting in accordance with whether the door is opened or closed, the lighting source 6 is controlled to emit light with high illuminance, as the door is now open. On the other hand, electrical current from the power source 11 does not flow through the decorative lighting source 7, and therefore the decorative lighting source 7 is not turned on.

When the lighting switch 8 is in sync with the door, and when the decorative lighting switch 9 is on and the door is closed, electrical current from the power source 11 flows through the lighting source 6, through the light dimming unit 13, and into ground from the decorative lighting switch 9. The lighting source 6 thus emits light with low illuminance. Further, electrical current from the power source 11 flows through the decorative lighting source 7 and into ground from the decorative lighting switch 9. The decorative lighting source 7 is thus turned on.

This results in a lighting design wherein the entire casing 4 glows reddish white while the periphery of the casing 4 glows blue. The vehicle interior light 1 as a whole is bright only to a degree that it does not hinder driving.

When the lighting switch 8 is in sync with the door, and when the decorative lighting switch 9 is off and the door is closed, electrical current from the power source 11 flows through the lighting source 6 and supplied to the ECU 10 from the lighting switch 8. The lighting source 6 is thus controlled by the ECU 10, and since the door is closed, the lighting source 6 is not turned on. On the other hand, electrical current from the power source 11 does not flow through the decorative lighting source 7, and therefore the decorative lighting source 7 is not turned on.

(3) When the Lighting Switch 8 is Off

When the lighting switch 8 is off and the decorative lighting switch 9 is on, electrical current from the power source 11 flows through the lighting source 6, through the light dimming unit 13, and into ground from the decorative lighting switch 9. The lighting source 6 thus emits light with low illuminance. Further, electrical current from the power source 11 flows through the decorative lighting source 7 and into ground from the decorative lighting switch 9. The decorative lighting source 7 is thus turned on.

When the lighting switch 8 is off and the decorative lighting switch 9 is off, electrical current from the power source 11 does not flow through either of the light sources 6 and 7 so that neither of them is turned on.

3. Effects of the Embodiment

According to the vehicle interior light 1 of the present embodiment, turning on the decorative lighting switch 9 makes the lighting source 6, light dimming unit 13, and decorative lighting switch 9 conductive to each other, thereby causing the lighting source 6 to emit light with low illuminance. Therefore, as compared to operating separately for high-intensity illuminating, low-intensity illuminating, and decorative illuminating as conventionally done, the operability can be enhanced. A passenger can operate the decorative lighting switch 9 at any given time to turn on the lighting source 6 with low illuminance, so that, in contrast to conventional low-intensity illuminating that is enabled only when the door is open, this feature can be effectively taken advantage of when it is desired to slightly illuminate the vehicle interior, for example, during driving at night.

Turning on the decorative lighting switch 9 also turns on the decorative lighting source 7 as well as lights up the lighting source 6 with low illuminance, so that the lighting design can be improved even more as compared to turning on the decorative lighting source 7 alone.

Moreover, the low-intensity illuminating of the lighting source 6 is achieved electrically by the light dimming unit 13 so that heat generation of the lighting source 6 is kept low and illuminating for a prolonged period does not lead to a large decrease of service life of the light source, and also there is no need to particularly increase heat resistance of the casing 4 or the like of the light source.

Furthermore, since the lighting source 6 and decorative lighting lamps are accommodated inside the same casing 4, they can share part of their respective circuits, whereby the number of components and the number of wiring steps can be reduced as compared to the case where the decorative lighting source 7 is mounted in a separate location.

Also, with the light dimming unit 13 being coupled across the wiring between the lighting source 6 and the lighting switch 8 and the wiring between the decorative lighting source 7 and the decorative lighting switch 9, sync control of each room lamp can be realized with a simple circuit. Moreover, since the light dimming unit 13 is made up of a resistor and a diode, this circuit can be realized at low cost and in a simple structure.

With the lighting source 6 being a bulb, it can secure the high illuminance necessary as a room lamp. With the decorative lighting source 7 being a blue LED, power consumption can be kept low, and the lighting design of the decorative lighting can be improved.

While the decorative lighting switch 9 of the present embodiment is simply grounded at one terminal thereof, it may be connected to the ECU 10 so as to cause the lighting source 6 and the decorative lighting source 7 to perform a decorative lighting sequence in various flashing patterns. One example of this would be determining a flashing pattern preliminarily and causing the light sources to flash in this pattern. Alternatively, the flashing pattern can be varied in accordance with a change in the locked state of the door, or running and stopping of the engine.

Further, while the lighting switch 8 is simply grounded at one terminal thereof, it may be connected to the ECU 10 to achieve lighting control of various flashing patterns similar to those described above. Moreover, control of brightness of the lighting source 6 in accordance with the driving state may be achieved. For example, the lighting source 6 may be controlled to emit light with low illuminance during driving. This enables an operation in which, when the decorative lighting switch 9 is on, the lighting source 6 is always lit up with low illuminance.

4. Other Embodiments

In a vehicle interior light 1' of another embodiment, the decorative lighting switch 9 is configured as a switch 9' that further includes a low-illuminance mode for turning on the lighting source 6 with low illuminance, in addition to the on/off switching mode of the decorative lighting source 7 alone.

Figure 4:
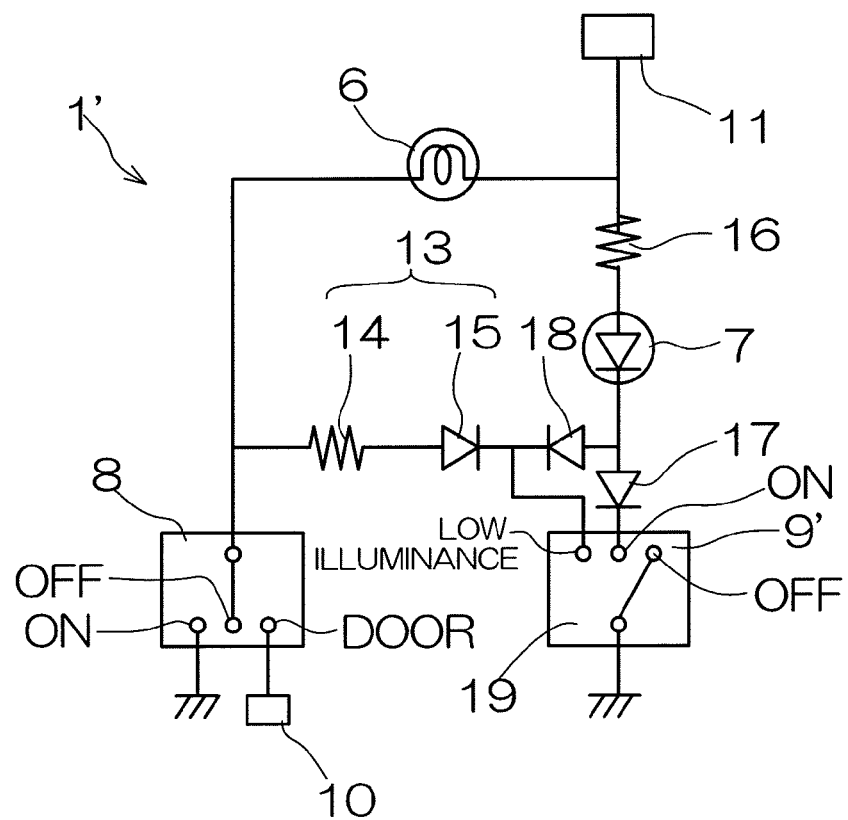
FIG. 4 is a circuit diagram showing a vehicle interior light of another embodiment.

In this case, as shown in FIG. 4, the power source 11, the lighting source 6, and the lighting switch 8 are connected in series. Also, the power source 11, a resistor 16, decorative lighting source 7, a protective diode 17, and a decorative lighting switch 9' are connected in series. Further, the decorative lighting source 7, a diode 18 for reverse current preventing purpose, and a low-illuminance mode terminal 19 of the decorative lighting switch 9' are connected in series. This low-illuminance mode terminal 19 is grounded. Further, the light dimming unit 13 is coupled across the wiring between the lighting source 6 and the lighting switch 8 and the low-illuminance mode terminal 19 of the decorative lighting switch 9'. The light dimming unit 13 is formed to include a resistor element 14, and a diode 15 as a reverse current preventing element that allows electric current from the lighting source 6 to pass to the decorative lighting switch 9', these being connected in series.

The light emitting states of each of the light sources 6 and 7 for each selected mode of the switches 8 and 9' are shown in Table 2. The term "low illuminance (low illumination intensity)" in the column of the decorative lighting switch 9' refers to a state in which the lighting source 6 is lit up with low illuminance in addition to the lighting of the decorative lighting source 7, "ON" refers to a state in which the decorative lighting source 7 only is lit up, and "OFF" refers to a state in which the decorative lighting source 7 is not lit up.

(1) When the Lighting Switch 8 is On

As shown in Table 2, when the lighting switch 8 is on and the decorative lighting switch 9' is in the low-illuminance mode, electrical current from the power source 11 flows through the lighting source 6 and into ground from the lighting switch 8. The lighting source 6 thus emits light with high illuminance. On the other hand, electrical current from the power source 11 flows through the decorative lighting source 7 and into ground from the decorative lighting switch 9'. The decorative lighting source 7 is thus turned on.

When the lighting switch 8 is on and the decorative lighting switch 9' is on, electrical current from the power source 11 flows through the lighting source 6 and into ground from the lighting switch 8. The lighting source 6 thus emits light with high illuminance. On the other hand, electrical current from the power source 11 flows through the decorative lighting source 7 and into ground from the decorative lighting switch 9'. The decorative lighting source 7 is thus turned on.

When the lighting switch 8 is on and the decorative lighting switch 9' is off, electrical current from the power source 11 flows through the lighting source 6 and into ground from the lighting switch 8. The lighting source 6 thus emits light with high illuminance. On the other hand, with the decorative lighting switch 9' being off, and by means of the diode 15 of the light dimming unit 13, electrical current from the power source 11 does not flow through the decorative lighting source 7, and therefore the decorative lighting source 7 is not turned on.

(2) When the Lighting Switch 8 is in Sync with the Door and the Door is Open

When the lighting switch 8 is in sync with the door, while the decorative lighting switch 9' is in the low-illuminance mode and the door is open, electrical current from the power source 11 flows through the lighting source 6 and supplied to the ECU 10 from the lighting switch 8. The lighting source 6 is thus controlled by the ECU 10, and since the door is open, the lighting source 6 is controlled to emit light with high illuminance. On the other hand, electrical current from the power source 11 flows through the decorative lighting source 7 and into ground from the decorative lighting switch 9'. The decorative lighting source 7 is thus turned on.

When the lighting switch 8 is in sync with the door, while the decorative lighting switch 9' is on and the door is open, electrical current from the power source 11 flows through the lighting source 6 and supplied to the ECU 10 from the lighting switch 8. The lighting source 6 is thus controlled by the ECU 10, and since the door is open, the lighting source 6 is controlled to emit light with high illuminance. On the other hand, electrical current from the power source 11 flows through the decorative lighting source 7 and into ground from the decorative lighting switch 9'. The decorative lighting source 7 is thus turned on.

When the lighting switch 8 is in sync with the door, while the decorative lighting switch 9' is off and the door is open,

TABLE 2

| | LIGHTING SWITCH | | | | | | | | | | | |
|---|---|---|---|---|---|---|---|---|---|---|---|---|
| | ON | | | DOOR SYNC MODE (DOOR OPEN) | | | DOOR SYNC MODE (DOOR CLOSE) | | | OFF | | |
| DECORATIVE LIGHTING SWITCH | LOW ILLU-MINANCE MODE | ON | OFF | LOW ILLU-MINANCE MODE | ON | OFF | LOW ILLU-MINANCE MODE | ON | OFF | LOW ILLU-MINANCE MODE | ON | OFF |
| LIGHTING SOURCE | ○ | ○ | ○ | ○ | ○ | ○ | Δ | X | X | Δ | X | X |
| DECORATIVE LIGHTING SOURCE | ○ | ○ | X | ○ | ○ | X | ○ | ○ | X | ○ | ○ | X |

○: EMITT (HIGH ILLUMINANCE),
Δ: EMITT (LOW ILLUMINANCE),
X: NOT EMITT electrical current from the power source 11 flows through the lighting source 6 and supplied to the ECU 10 from the lighting switch 8. The lighting source 6 is thus controlled by the ECU 10, and since the door is open, the lighting source 6 is controlled to emit light with high illuminance. On the other hand, electrical current from the power source 11 does not flow through the decorative lighting source 7, and therefore the decorative lighting source 7 is not turned on.

(3) When the Lighting Switch 8 is in Sync with the Door and the Door is Closed

When the lighting switch 8 is in sync with the door, while the decorative lighting switch 9' is in the low-illuminance mode and the door is closed, electrical current from the power source 11 flows through the lighting source 6 and supplied to the ECU 10 from the lighting switch 8. The lighting source 6 is thus controlled by the ECU 10, and since the door is closed, the lighting source 6 emits light with low illuminance. On the other hand, electrical current from the power source 11 flows through the decorative lighting source 7 and into ground from the decorative lighting switch 9'. The decorative lighting source 7 is thus turned on.

When the lighting switch 8 is in sync with the door, while the decorative lighting switch 9' is on and the door is closed, electrical current from the power source 11 flows through the lighting source 6 and supplied to the ECU 10 from the lighting switch 8. The lighting source 6 is thus controlled by the ECU 10, and since the door is closed, the lighting source 6 is not turned on. On the other hand, electrical current from the power source 11 flows through the decorative lighting source 7 and into ground from the decorative lighting switch 9'. The decorative lighting source 7 is thus turned on.

When the lighting switch 8 is in sync with the door, while the decorative lighting switch 9' is off and the door is closed, electrical current from the power source 11 flows through the lighting source 6 and supplied to the ECU 10 from the lighting switch 8. The lighting source 6 is thus controlled by the ECU 10, and since the door is closed, the lighting source 6 is not turned on. On the other hand, electrical current from the power source 11 does not flow through the decorative lighting source 7, and therefore the decorative lighting source 7 is not turned on.

(4) When the Lighting Switch 8 is Off

When the lighting switch 8 is off and the decorative lighting switch 9' is in the low-illuminance mode, electrical current from the power source 11 flows through the lighting source 6 and into ground from the decorative lighting switch 9'. The lighting source 6 thus emits light with low illuminance. On the other hand, electrical current from the power source 11 flows through the decorative lighting source 7 and into ground from the decorative lighting switch 9'. The decorative lighting source 7 is thus turned on.

When the lighting switch 8 is off and the decorative lighting switch 9' is on, electrical current from the power source 11 does not flow through the lighting source 6 so that the lighting source 6 is not turned on. On the other hand, electrical current from the power source 11 flows through the decorative lighting source 7 and into ground from the decorative lighting switch 9'. The decorative lighting source 7 is thus turned on.

When the lighting switch 8 is off and the decorative lighting switch 9' is off, neither of the light sources 6 and 7 is turned on.

5. Effects of Other Embodiments

According to the vehicle interior light 1' of this other embodiment, when the decorative lighting switch 9 is turned on, the decorative lighting source 7 only can be used for the decorative lighting purpose, while when it is set to the low-illuminance mode, both the decorative lighting source 7 and the lighting source 6 can be used for the decorative lighting purpose. Further, when the lighting source 6 is used for the decorative lighting purpose, it is lit up with low illuminance.

The present invention is not limited to the exemplary embodiments illustrated above and can be embodied with various modifications made within the scope of the present invention in accordance with the purposes and applications. While in each of the embodiments described above, when the lighting source 6 is connected to the ECU 10, the ECU 10 selects one of the low-illuminance, high-illuminance, and no-lighting modes, the invention is not limited in this regard, and for example, the ECU may provide decorative lighting such as flashing or the like.

While a blue LED is employed as the decorative lighting source 7 in the above embodiments, the invention is not limited in this regard and LEDs of other colors may be used.

While the light dimming unit 13 is formed of the resistor 14 and diode 15 connected in series, the invention is not limited in this regard and it may be any other components such as semiconductors that reduce the electrical current.

The invention is used as an interior lighting technique for illuminating interiors of vehicles. In particular, the invention is suitably used as an interior lighting technique having high-intensity illuminating and low-intensity illuminating functions of a room lamp as well as a decorative lighting function.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A vehicle interior light, comprising:
   a lighting source that illuminates a vehicle interior;
   a decorative lighting source that decoratively illuminates the vehicle interior;
   a lighting switch that controls an on-off state of the lighting source;
   a decorative lighting switch that controls an on-off state of the decorative lighting source and the on-off state of the lighting source; and
   a light dimming unit that lowers an illuminance of the lighting source,
   wherein when the decorative lighting source is turned on, power is supplied to the decorative lighting source so that the decorative lighting source is lit up, and power is supplied to the lighting source through the light dimming unit so that the lighting source is lit up with a low illuminance.

2. The vehicle interior light according to claim 1, wherein the light dimming unit is provided to connect a wiring between the lighting source and the lighting switch with a wiring between the decorative lighting source and the decorative lighting switch.

3. The vehicle interior light according to claim 2, wherein the light dimming unit includes a resistor element, and a reverse current preventing element that prevents the decorative lighting source from being lit up by the lighting switch.

4. The vehicle interior light according to claim 3, wherein the lighting source is a bulb, and the decorative lighting source is an LED.

5. The vehicle interior light according to claim 2, wherein the lighting source is a bulb, and the decorative lighting source is an LED.

* * * * *